United States Patent
Åkesson et al.

(10) Patent No.: US 10,506,551 B2
(45) Date of Patent: Dec. 10, 2019

(54) PAGING IN A GROUP COMMUNICATIONS SYSTEM

(71) Applicant: Telefonaktiebolaget LM Ericsson (publ), Stockholm (SE)

(72) Inventors: Joakim Åkesson, Landvetter (SE); Magnus Tränk, Lerum (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/061,147

(22) PCT Filed: Sep. 13, 2016

(86) PCT No.: PCT/EP2016/071604
§ 371 (c)(1),
(2) Date: Jun. 11, 2018

(87) PCT Pub. No.: WO2017/102114
PCT Pub. Date: Jun. 22, 2017

(65) Prior Publication Data
US 2018/0368102 A1    Dec. 20, 2018

Related U.S. Application Data

(60) Provisional application No. 62/267,454, filed on Dec. 15, 2015.

(51) Int. Cl.
*H04W 68/02* (2009.01)
*H04W 76/45* (2018.01)
(Continued)

(52) U.S. Cl.
CPC ............ *H04W 68/02* (2013.01); *H04W 4/06* (2013.01); *H04W 76/19* (2018.02); *H04W 76/45* (2018.02); *H04W 76/40* (2018.02)

(58) Field of Classification Search
CPC ..... H04W 68/02; H04W 76/19; H04W 76/40; H04W 76/45; H04W 4/06
See application file for complete search history.

(56) References Cited

U.S. PATENT DOCUMENTS

| 2008/0090593 A1* | 4/2008 | Jen | H04W 68/02 |
| | | | 455/458 |
| 2010/0248742 A1* | 9/2010 | Song | H04L 12/185 |
| | | | 455/456.1 |

(Continued)

FOREIGN PATENT DOCUMENTS

| EP | 1 435 751 A1 | 7/2004 |
| EP | 2 299 772 A1 | 3/2011 |

(Continued)

OTHER PUBLICATIONS

International Search Report and Written Opinion issued in International Application No. PCT/EP2016/071604, dated Oct. 24, 2016, 8 pages.

(Continued)

*Primary Examiner* — Robert C Scheibel
(74) *Attorney, Agent, or Firm* — Rothwell, Figg, Ernst & Manbeck, P.C.

(57) ABSTRACT

There is provided mechanisms for paging at least one client node in a group communications system. A method is performed by a control node of the group communications system. The method comprises obtaining a need for paging the at least one client node in the group communications system. The method comprises transmitting a paging message for the at least one client node on a multimedia broadcast multicast service (MBMS) bearer to the at least one client node. There is also provided a control node configured to perform such a method. There is also provided mechanisms for receiving paging in a group communications system.

16 Claims, 6 Drawing Sheets

(51) Int. Cl.
*H04W 4/06* (2009.01)
*H04W 76/19* (2018.01)
*H04W 76/40* (2018.01)

(56) References Cited

U.S. PATENT DOCUMENTS

| | | | |
|---|---|---|---|
| 2013/0136049 A1* | 5/2013 | Song | H04W 76/40 370/312 |
| 2015/0131510 A1* | 5/2015 | Gilbert | H04W 72/005 370/312 |
| 2016/0150590 A1* | 5/2016 | Pocha | H04L 65/4076 370/329 |
| 2017/0164161 A1* | 6/2017 | Gupta | H04W 4/06 |
| 2017/0171836 A1* | 6/2017 | Gupta | H04W 68/02 |

FOREIGN PATENT DOCUMENTS

| | | |
|---|---|---|
| EP | 2 346 292 A1 | 7/2011 |
| JP | 2009171013 A | 7/2009 |
| JP | 2014519760 A | 8/2014 |
| WO | 2010/005036 A1 | 1/2010 |
| WO | 2010/052832 A1 | 5/2010 |
| WO | 2012/166893 A1 | 12/2012 |
| WO | 2012166893 A1 | 12/2012 |

OTHER PUBLICATIONS

International Preliminary Report on Patentability issued in International Application No. PCT/EP2016/071604, dated Dec. 14, 2017, 15 pages.

3GPP, 3rd Generation Partnership Project; Technical Specification Group Radio Access Network; Evolved Universal Terrestrial Radio Access (E-UTRA); User Equipment (UE) procedures in idle mode (Release 12), 3GPP TS 36.304 V12.6.0 (Sep. 2015), 38 pages.

3GPP, 3rd Generation Partnership Project; Technical Specification Group Services and System Aspects; Functional architecture and information flows to support mission critical communication services; Stage 2 (Release 13), 3GPP TS 23.179 V1.2.0 (Dec. 2015), 206 pages.

Korean Office Action and English Translation, issued in corresponding Korean Patent Application No. 2018-530801, dated May 21, 2019, 7 pages.

* cited by examiner

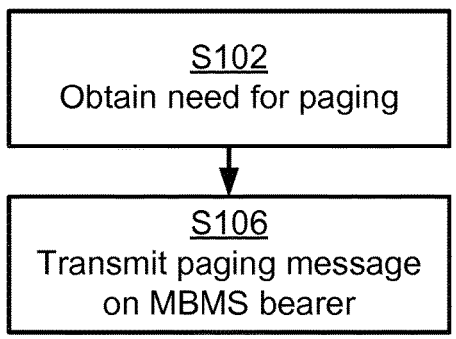
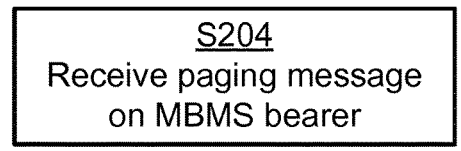
Fig. 5
Fig. 7
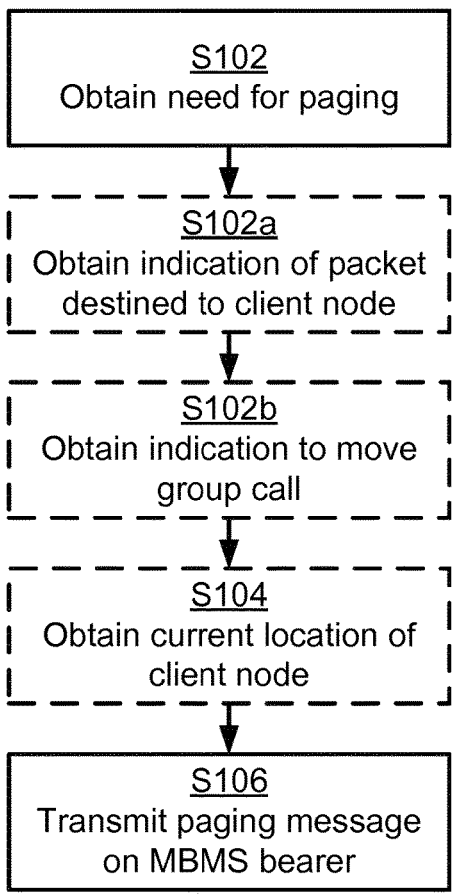
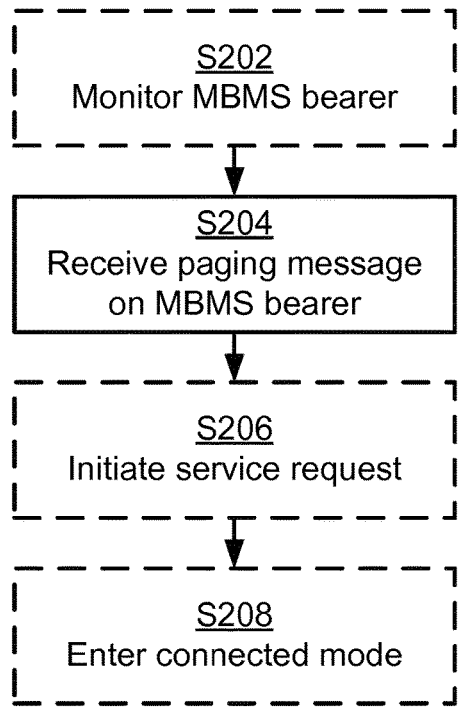
Fig. 6
Fig. 8

PAGING IN A GROUP COMMUNICATIONS SYSTEM

CROSS REFERENCE TO RELATED APPLICATION(S)

This application is a 35 U.S.C. § 371 National Stage of International Patent Application No. PCT/EP2016/071604, filed Sep. 13, 2016, designating the United States and claiming priority to U.S. provisional application No. 62/267,454, filed on Dec. 15, 2015. The above identified applications are incorporated by reference.

TECHNICAL FIELD

Embodiments presented herein relate to a method, a control node, a computer program, and a computer program product for paging at least one client node in a group communications system. Embodiments presented herein further relate to a method, a client node, a computer program, and a computer program product for receiving paging in a group communications system.

BACKGROUND

In communications networks, there may be a challenge to obtain good performance and capacity for a given communications protocol, its parameters and the physical environment in which the communications network is deployed.

An example of applications available in some communications system is group communications services. In general terms, group communication means that the same information or media is delivered to multiple client nodes. In group communication systems (e.g., Push-To-Talk (PTT) systems) the client nodes receiving the same media constitute a group of client nodes. These client nodes may be located at different locations. If many client nodes are located within the same area, multicast or broadcast based transmission using e.g., Multicast-Broadcast Multimedia Services (MBMS) is efficient for communications to the group of client nodes, because communications resources such as time and frequency resources are shared among client nodes. If client nodes are spread out over a large geographical area it can be more efficient to use unicast transmission for communications to the group of client nodes. However, even if MBMS-based transmission is preferred, there may not be sufficient MBMS resources available to serve all groups of client nodes. Some client nodes and groups thereof may then be served using unicast transmission.

When using MBMS to broadcast media in a group communications system, the transmitting client node uses unicast transmission to transmit the media to the group communications system, and a control node in the group communications system uses broadcast-based transmission to send the media to client nodes participating in the group communication.

When Mobile Terminated (MT) traffic (i.e., traffic terminated at one of the client nodes) is initiated to a client node that is in an idle mode (e.g., radio resource control (RRC) idle in the Long Term Evolution (LTE) suite of telecommunications standards) the client node is normally asleep and only listens periodically for paging information (e.g. to the Physical Downlink Control Channel (PDCCH) in LTE). If there is a paging message the client node would demodulate the paging channel (denoted PCH in LTE). The paging cycle can be set to between 320 to 2560 ms. This means that when the paging cycle is 320 ms, the average wake up time for the client node is 160 ms depending on when the traffic arrives in relation to the paging cycle. On top of this it takes approximately 100 ms to change state on the client node from idle mode to connected mode.

Such delay is an issue in some communication scenarios, for instance when broadcast-based transmission is used in delay-critical applications.

For real time applications such as, but not limited to, PTT, this can impact the call setup and mouth-to-ear delay if the PTT system is using unicast transmission and some of the receiving client nodes are in idle mode. Potentially packets may also be dropped until the client nodes reach connected mode and re-establishes a radio bearer (RAB).

Hence, there is still a need for an improved handling of real time critical services, such as PTT, in a group communications system.

SUMMARY

An object of embodiments herein is to provide efficient handling of real time critical services, such as PTT, in a group communications system.

According to a first aspect there is presented a method for paging at least one client node in a group communications system. The method is performed by a control node of the group communications system. The method comprises obtaining a need for paging the at least one client node in the group communications system. The method comprises transmitting a paging message for the at least one client node on a multimedia broadcast multicast service (MBMS) bearer to the at least one client node.

Advantageously this method provides efficient paging of client nodes in a group communications system, which enables efficient handling of real time critical services, such as PTT, in a group communications system.

According to a second aspect there is presented a control node for paging at least one client node in a group communications system. The control node comprises processing circuitry. The processing circuitry is configured to cause the control node to obtain a need for paging the at least one client node in the group communications system. The processing circuitry is configured to cause the control node to transmit a paging message for the at least one client node on an MBMS bearer to the at least one client node.

Advantageously this control node provides efficient paging of client nodes in a group communications system, which enables efficient handling of real time critical services, such as PTT, in a group communications system.

According to a third aspect there is presented a control node for paging at least one client node in a group communications system. The control node comprises processing circuitry. The control node comprises a computer program product storing instructions that, when executed by the processing circuitry, causes the control node to perform a set of operations, or steps. The set of operations, or steps, involves the control node to obtain a need for paging the at least one client node in the group communications system. The set of operations, or steps, involves the control node to transmit a paging message for the at least one client node on an MBMS bearer to the at least one client node.

Advantageously this control node provides efficient paging of client nodes in a group communications system, which enables efficient handling of real time critical services, such as PTT, in a group communications system.

According to a fourth aspect there is presented a control node for paging at least one client node in a group communications system. The control node comprises an obtain module configured to obtain a need for paging the at least one client node in the group communications system. The control node comprises a transmit module configured to transmit a paging message for the at least one client node on an MBMS bearer to the at least one client node.

Advantageously this control node provides efficient paging of client nodes in a group communications system, which enables efficient handling of real time critical services, such as PTT, in a group communications system.

According to a fifth aspect there is presented a computer program for paging at least one client node in a group communications system, the computer program comprising computer program code which, when run on processing circuitry of a control node, causes the control node to perform a method according to the first aspect.

Advantageously this computer program provides efficient paging of client nodes in a group communications system, which enables efficient handling of real time critical services, such as PTT, in a group communications system.

According to a sixth aspect there is presented a method for receiving paging in a group communications system. The method is performed by a client node. The method comprises receiving a paging message for the client node on an MBMS bearer from a control node of the group communications system.

Advantageously this method enables efficient paging of the client node in a group communications system, which enables efficient handling of real time critical services, such as PTT, in a group communications system.

According to a seventh aspect there is presented a client node for receiving paging in a group communications system. The client node comprises processing circuitry. The processing circuitry is configured to cause the client node to receive a paging message for the client node on an MBMS bearer from a control node of the group communications system.

Advantageously this client node enables efficient paging of the client node in a group communications system, which enables efficient handling of real time critical services, such as PTT, in a group communications system.

According to an eighth aspect there is presented a client node for receiving paging in a group communications system. The client node comprises processing circuitry. The client node comprises a computer program product storing instructions that, when executed by the processing circuitry, causes the client node to perform a set of operations, or steps. The set of operations, or steps, involves the client node to receive a paging message for the client node on an MBMS bearer from a control node of the group communications system.

Advantageously this client node enables efficient paging of the client node in a group communications system, which enables efficient handling of real time critical services, such as PTT, in a group communications system.

According to a ninth aspect there is presented a client node for receiving paging in a group communications system. The client node comprises a receive module configured to receive a paging message for the client node on an MBMS bearer from a control node of the group communications system.

Advantageously this client node enables efficient paging of the client node in a group communications system, which enables efficient handling of real time critical services, such as PTT, in a group communications system.

According to a tenth aspect there is presented a computer program for receiving paging in a group communications system, the computer program comprising computer program code which, when run on processing circuitry of a client node, causes the client node to perform a method according to the sixth aspect.

Advantageously this computer program provides efficient paging of the client node in a group communications system, which enables efficient handling of real time critical services, such as PTT, in a group communications system.

According to an eleventh aspect there is presented a computer program product comprising a computer program according to at least one of the fifth aspect and the tenth aspect and a computer readable storage medium on which the computer program is stored. The computer readable storage medium can be a non-transitory computer readable storage medium.

Advantageously this computer program product provides efficient paging of client nodes in a group communications system, which enables efficient handling of real time critical services, such as PTT, in a group communications system.

Advantageously these methods, this control node, this client node, and these computer programs enable real time critical services to be set up in a manner that minimizes the latency to set up a radio bearer to enable downlink delivery of packets to a client node.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIGS. 5, 6, 7, and 8 are flowcharts of methods according to embodiments;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
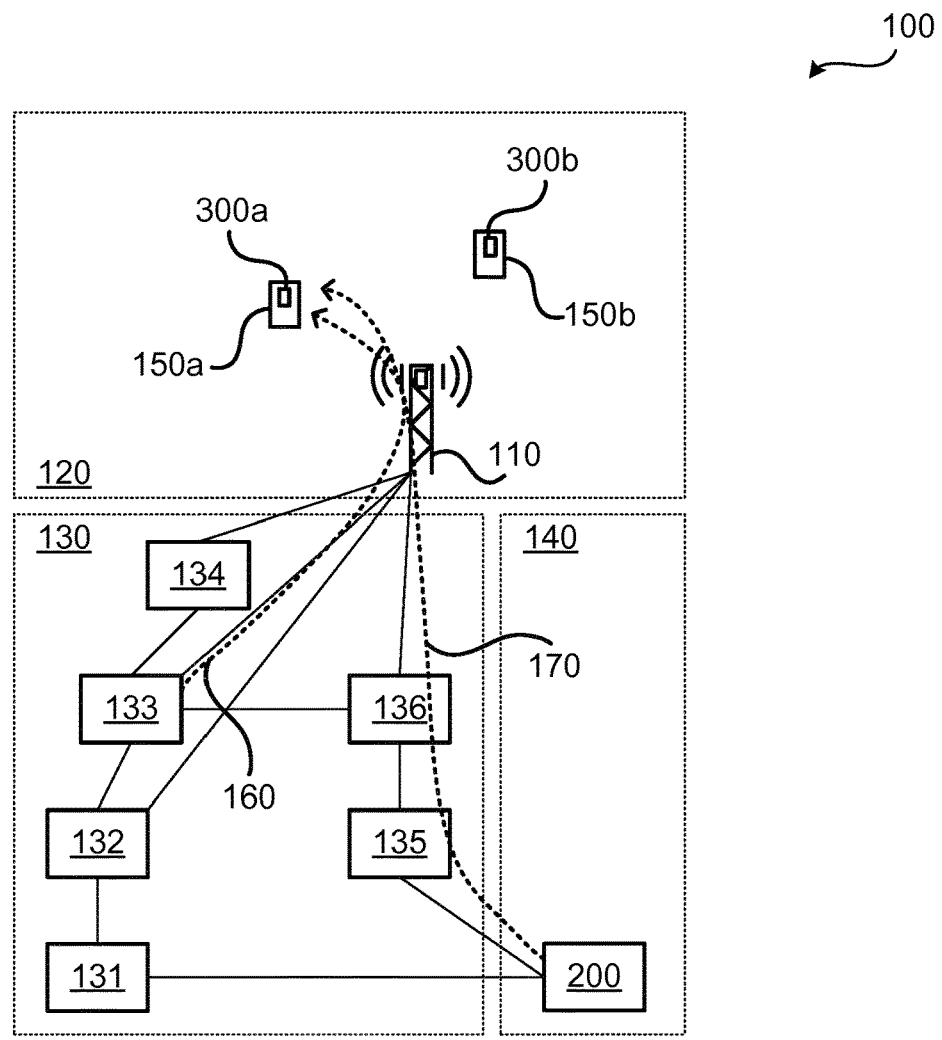
FIGS. 1 and 11 are schematic diagrams illustrating communications system according to embodiments.

FIG. 1 is a schematic diagram illustrating a communications system 100 where embodiments presented herein can be applied. The communications system 100 is assumed to provide services for group communication and may hence be regarded as a group communications system. The group communications system 100 is, according to some aspects, a push to talk (PTT) system.

The communications system 100 comprises a radio access network 120, a core network 130, and a service network 140. Particularly, the communications system 100 comprises at least one control node 200 and at least one client node 300a, 300b. The at least one control node 200 may be provided in, or installed on, a radio access network node 110 or in another entity or device in a radio access network 120, in an entity or device of a core network 130, or in an entity or device of a service network 140. Each client node 300a, 300b may be provided in, or installed on, a respective wireless device 150a, 150b. The radio access network 120 is operatively connected to the core network 130 which in turn is operatively connected to the service network 140. The radio access network node 110 thereby enables the wireless devices 150a, 150b, and hence the client nodes 300a, 300b, to access services and exchange data as provided by the service network 140.

Examples of wireless devices 150a, 150b include, but are not limited to, mobile stations, mobile phones, handsets, wireless local loop phones, user equipment (UE), smartphones, laptop computers, and tablet computers. Examples of radio access network nodes 110 include, but are not limited to, radio base stations, base transceiver stations, node Bs, evolved node Bs, and access points. As the skilled person understands, the communications system 100 may comprise a plurality of radio access network nodes 110, each providing network access to a plurality of wireless devices 150a, 150b.

The herein disclosed embodiments are not limited to any particular number of radio access network nodes 110, client nodes 300a, 300b, or wireless devices 150a, 150b.

Figure 9:
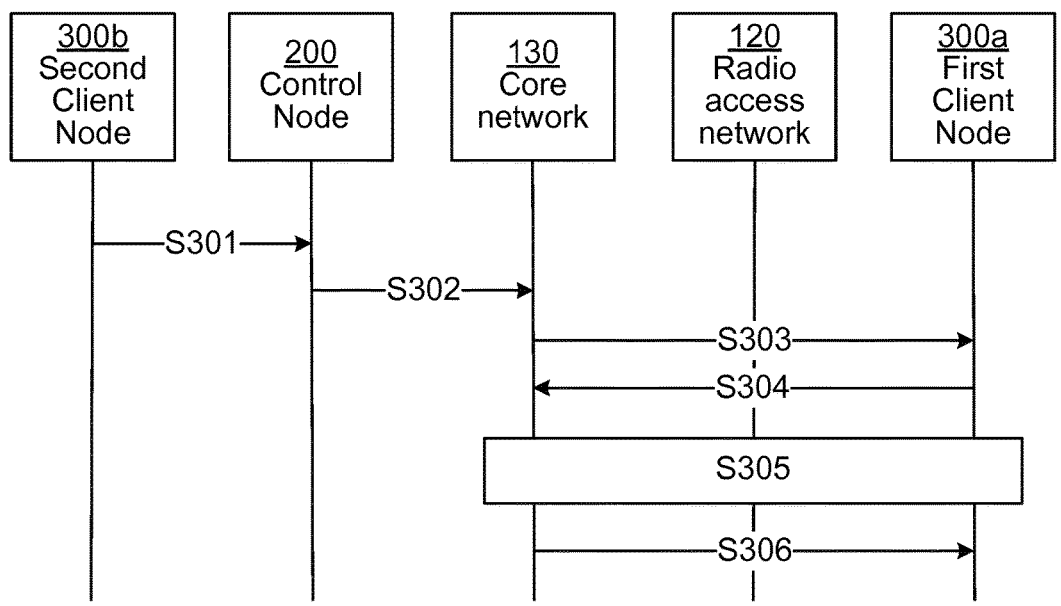
FIG. 9 is a signalling diagram according to prior art.

One example of paging a client node 300a, denoted a first client node, in the group communications system 100 will now be disclosed in detail with reference to the signalling diagram of FIG. 9.

S301: A client node 300b, denoted a second client node, transmits data intended to be received by the first client node 300a.

S302: The control node 200 obtains an indication that the second client node 300b transmits data intended to be received by the first client node 300a. In response thereto the control node 200 transmits the data to the core network 130.

S303: The core network 130 pages the first client node 300a over the radio access network 120.

S304: The first client node 300a, in response to having received the paging, makes a service request to the core network 130 over the radio access network 120.

S305: A unicast radio access bearer is established for the first client node 300a in response to the service request. This causes the first client node 300a to enter connected mode.

S306: The core network 130 delivers the data to the first client node 300a using unicast transmission over the established radio access bearer.

As noted above, for real time applications such as, but not limited to, PTT, the currently used procedure of paging the client nodes 300a, 300b can impact the call setup and mouth-to-ear delay if the PTT system is using unicast transmission and some of the receiving client nodes are in idle mode. Potentially packets may also be dropped until the client nodes 300a, 300b reach connected mode and re-establishes a radio bearer (RAB). This creates a need for an improved handling of real time critical services in the communications system 100.

Particularly, the core network 130 comprises a packet data network gateway (PGW) 131, a serving gateway (SGW) 132, a mobility management entity (MME) 133, a multicell coordination entity (MCE) 134, a broadcast multicast service centre (BM-SC) 135, and an MBMS gateway (MBMS GW) 136. The PGW 131, SGW 132, MME 133, MCE 134, BM-SC 135, and MBMS GW 136 perform functionalities as known in the art and further description thereof is therefore omitted. In this respect, paging of client node 300a is according to state of the art performed along a signalling flow defined by arrow 160 (from MME 133) whereas paging of client node 300a according to embodiments as will been disclosed below is performed along a signalling flow defined by arrow 170 (from control node 200 via BM-SC 135, and MBMS GW 136).

The embodiments disclosed herein therefore relate to mechanisms for paging at least one client node 300a, 300b, 300c, 300d, 300e in a group communications system 100, 1100a, 1100b, 1100c. In order to obtain such mechanisms there is provided a control node 200, a method performed by the control node 200, a computer program product comprising code, for example in the form of a computer program, that when run on processing circuitry of the control node 200, causes the control node 200 to perform the method. The embodiments disclosed herein further relate to mechanisms for receiving paging in a group communications system 100, 1100a, 1100b, 1100c. In order to obtain such mechanisms there is further provided a client node 300a, a method performed by the client node 300a, and a computer program product comprising code, for example in the form of a computer program, that when run on processing circuitry of the client node 300a, causes the client node 300a to perform the method.

Figure 2A:
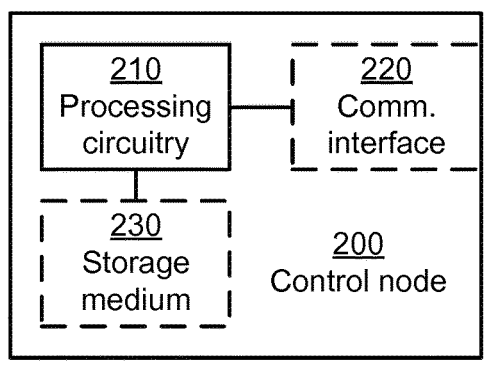
FIG. 2a is a schematic diagram showing functional units of a control node according to an embodiment.

FIG. 2a schematically illustrates, in terms of a number of functional units, the components of a control node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 410a (as in FIG. 4), e.g. in the form of a storage medium 230. The processing circuitry 210 may further be provided as at least one application specific integrated circuit (ASIC), or field programmable gate array (FPGA).

Particularly, the processing circuitry 210 is configured to cause the control node 200 to perform a set of operations, or steps, S102-S106, S402, S403. These operations, or steps, S102-S106, S402, S403 will be disclosed below. For example, the storage medium 230 may store the set of operations, and the processing circuitry 210 may be configured to retrieve the set of operations from the storage medium 230 to cause the control node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The control node 200 may further comprise a communications interface 220 for communications at least with a client node 300a. As such the communications interface 220 may comprise one or more transmitters and receivers, comprising analogue and digital components and a suitable number of antennas for wireless communications and ports for wireline communications.

The processing circuitry 210 controls the general operation of the control node 200 e.g. by sending data and control signals to the communications interface 220 and the storage medium 230, by receiving data and reports from the communications interface 220, and by retrieving data and instructions from the storage medium 230. Other components, as well as the related functionality, of the control node 200 are omitted in order not to obscure the concepts presented herein.

Figure 2B:
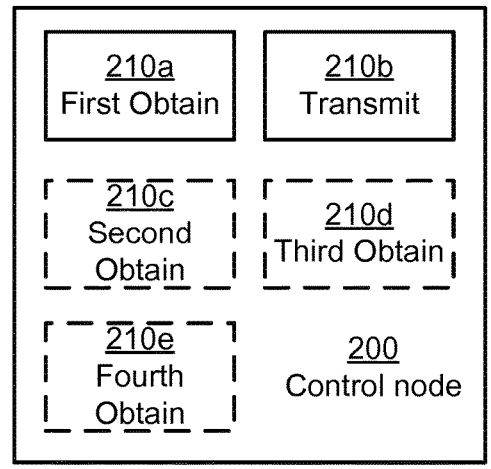
FIG. 2b is a schematic diagram showing functional modules of a control node according to an embodiment.

FIG. 2b schematically illustrates, in terms of a number of functional modules, the components of a control node 200 according to an embodiment. The control node 200 of FIG. 2b comprises a number of functional modules; a first obtain module 210a configured to perform below step S102, and a transmit module 210b configured to perform below steps S106, S403. The control node 200 of FIG. 2b may further comprise a number of optional functional modules, such as any of a second obtain module 210c configured to perform below steps S102a, S402, a third obtain module 210d configured to perform below step S102b, and a fourth obtain module 210e configured to perform below step S104. The functionality of each functional module 210a-210e will be further disclosed below in the context of which the functional modules 210a-210e may be used. In general terms, each functional module 210a-210e may be implemented in hardware or in software. Preferably, one or more or all functional modules 210a-210e may be implemented by the processing circuitry 210, possibly in cooperation with functional units 220 and/or 230. The processing circuitry 210 may thus be arranged to from the storage medium 230 fetch instructions as provided by a functional module 210a-210e and to execute these instructions, thereby performing any steps as will be disclosed hereinafter.

The control node 200 may be provided as a standalone device or as a part of at least one further device. For example, the control node 200 may be provided in a node of the radio access network or in a node of the core network. Alternatively, functionality of the control node 200 may be distributed between at least two devices, or nodes. These at least two nodes, or devices, may either be part of the same network part (such as the radio access network or the core network) or may be spread between at least two such network parts. Some examples of where in the communications system 100 the control node 200 may be provided are illustrated in FIG. 1.

Functionality of the control node 200 may be implemented at the service layer of the protocol stack. In general terms, instructions that are required to be performed in real time may be performed in a device, or node, operatively closer to the radio access network than instructions that are not required to be performed in real time. In this respect, at least part of the control node 200 may reside in the radio access network, such as in the radio access network node, for cases when embodiments as disclosed herein are performed in real time.

Thus, a first portion of the instructions performed by the control node 200 may be executed in a first device, and a second portion of the of the instructions performed by the control node 200 may be executed in a second device; the herein disclosed embodiments are not limited to any particular number of devices on which the instructions performed by the control node 200 may be executed. Hence, the methods according to the herein disclosed embodiments are suitable to be performed by a control node 200 residing in a cloud computational environment. Therefore, although a single processing circuitry 210 is illustrated in FIG. 2a the processing circuitry 210 may be distributed among a plurality of devices, or nodes. The same applies to the functional modules 210a-210e of FIG. 2b and the computer program 420a of FIG. 4 (see below).

Figure 3A:
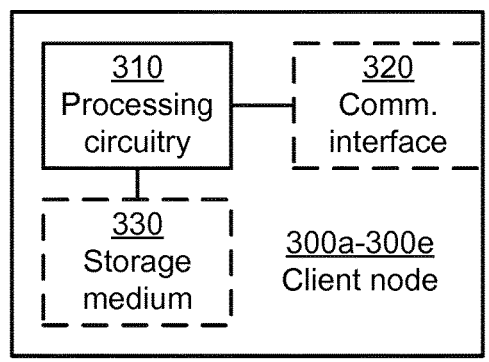
FIG. 3a is a schematic diagram showing functional units of a client node according to an embodiment.

FIG. 3a schematically illustrates, in terms of a number of functional units, the components of a client node 300a according to an embodiment. Processing circuitry 310 is provided using any combination of one or more of a suitable central processing unit (CPU), multiprocessor, microcontroller, digital signal processor (DSP), etc., capable of executing software instructions stored in a computer program product 410b (as in FIG. 4), e.g. in the form of a storage medium 330. The processing circuitry 310 may further be provided as at least one application specific integrated circuit (ASIC), or field programmable gate array (FPGA).

Particularly, the processing circuitry 310 is configured to cause the client node 300a to perform a set of operations, or steps, S202-S208, S404, S405, S406. These operations, or steps, S202-S208, S404, S405, S406 will be disclosed below. For example, the storage medium 330 may store the set of operations, and the processing circuitry 310 may be configured to retrieve the set of operations from the storage medium 330 to cause the client node 300a to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The client node 300a may further comprise a communications interface 320 for communications at least with a control node 200. As such the communications interface 320 may comprise one or more transmitters and receivers, comprising analogue and digital components and a suitable number of antennas for wireless communications and ports for wireline communications.

The processing circuitry 310 controls the general operation of the client node 300a e.g. by sending data and control signals to the communications interface 320 and the storage medium 330, by receiving data and reports from the communications interface 320, and by retrieving data and instructions from the storage medium 330. Other components, as well as the related functionality, of the client node 300a are omitted in order not to obscure the concepts presented herein.

Figure 3B:
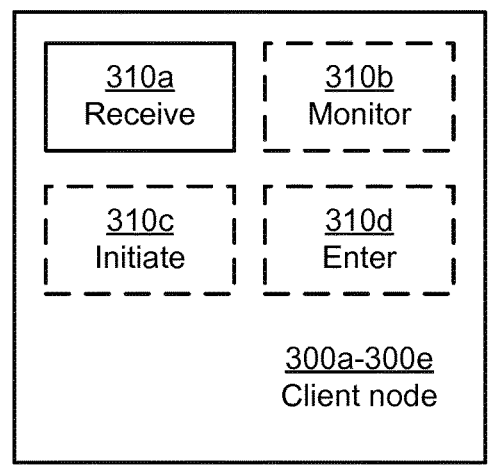
FIG. 3b is a schematic diagram showing functional modules of a client node according to an embodiment.

FIG. 3b schematically illustrates, in terms of a number of functional modules, the components of a client node 300a according to an embodiment. The client node 300a of FIG. 3b comprises a receive module 310a configured to perform below steps S204, S404. The client node 300a of FIG. 3b may further comprises a number of optional functional modules, such as any of a monitor module 31a configured to perform below step S202, an initiate module 310c configured to perform below steps S206, S405, and an enter module 310d configured to perform below step S208, S406. The functionality of each functional module 310a-310d will be further disclosed below in the context of which the functional modules 310a-310d may be used. In general terms, each functional module 310a-310d may be implemented in hardware or in software. Preferably, one or more or all functional modules 310a-310d may be implemented by the processing circuitry 310, possibly in cooperation with functional units 320 and/or 330. The processing circuitry 310 may thus be arranged to from the storage medium 330 fetch instructions as provided by a functional module 310a-310d and to execute these instructions, thereby performing any steps as will be disclosed hereinafter.

The client node 300a may be provided as a standalone device or as a part of at least one further device. For example, the client node 300a may be provided in a wireless device 150a. Hence, any processing circuitry, communications interface and storage medium of the wireless device 150a may be shared with the processing circuitry 310, communications interface 320 and storage medium 330 of the client node 300a. It is thus not necessary for the client node 300a to have its own processing circuitry 310, communications interface 320 and storage medium 330 as long as the processing circuitry, communications interface and storage medium of the wireless device 150a is configured to implement the functionality of the herein disclosed client node 300a.

Figure 4:
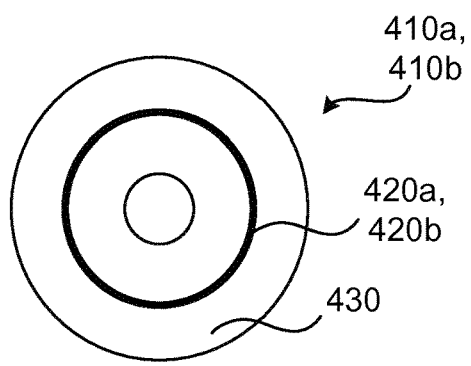
FIG. 4 shows one example of a computer program product comprising computer readable means according to an embodiment.

FIG. 4 shows one example of a computer program product 410a, 410b comprising computer readable means 430. On this computer readable means 430, a computer program 420a can be stored, which computer program 420a can cause the processing circuitry 210 and thereto operatively coupled entities and devices, such as the communications interface 220 and the storage medium 230, to execute methods according to embodiments described herein. The computer program 420a and/or computer program product 410a may thus provide means for performing any steps of the control node 200 as herein disclosed. On this computer readable means 430, a computer program 420b can be stored, which computer program 420b can cause the processing circuitry 310 and thereto operatively coupled entities and devices, such as the communications interface 320 and the storage medium 330, to execute methods according to embodiments described herein. The computer program 420b and/or computer program product 410b may thus provide means for performing any steps of the client node 300a as herein disclosed.

In the example of FIG. 4, the computer program product 410a, 410b is illustrated as an optical disc, such as a CD (compact disc) or a DVD (digital versatile disc) or a Blu-Ray disc. The computer program product 410a, 410b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 420a, 420b is here schematically shown as a track on the depicted optical disk, the computer program 420a, 420b can be stored in any way which is suitable for the computer program product 410a, 410b.

FIGS. 5 and 6 are flow charts illustrating embodiments of methods for paging at least one client node 300a, 300b, 300c, 300d, 300e in a group communications system 100, 1100a, 1100b, 1100c as performed by the control node 200. FIGS. 7 and 8 are flow charts illustrating embodiments of methods for receiving paging in a group communications system 100, 1100a, 1100b, 1100c as performed by the client node 300a. The methods are advantageously provided as computer programs 420a, 420b.

Reference is now made to FIG. 5 illustrating a method for paging at least one client node 300a, 300b, 300c, 300d, 300e in a group communications system 100, 1100a, 1100b, 1100c as performed by the control node 200 according to an embodiment.

It is assumed that there is a need for paging the at least one client node 300a, 300b, 300c, 300d, 300e in the group communications system 100, 1100a, 1100b, 1100c. The control node 200 is therefore configured to obtain such a need by performing step S102:

S102: The control node 200 obtains a need for paging the at least one client node 300a, 300b, 300c, 300d, 300e in the group communications system 100, 1100a, 1100b, 1100c. Different ways for how the control node 200 can obtain this need for paging will be disclosed below. In this respect the first obtain module 210a comprises instructions that when executed by the control node 200 causes the processing circuitry 210, possibly in conjunction with the communications interface 220 and the storage medium 230, to obtain the need for paging in order for the control node 200 to perform step S102.

Transmission of the paging is combined with application level paging over MBMS, thereby enabling the at least one client node 300a, 300b, 300c, 300d, 300e being paged to speed up its switch to connected mode, and thereby allowing the at least one client node 300a, 300b, 300c, 300d, 300e being paged to receive packets in a fast and efficient manner. Hence, the control node 200 is configured to transmit a paging message 1120 as in step S106:

S106: The control node 200 transmits a paging message 1120 for the at least one client node 300a, 300b, 300c, 300d, 300e. The paging message 1120 is transmitted on an MBMS bearer to the at least one client node 300a, 300b, 300c, 300d, 300e. In this respect the transmit module 210b comprises instructions that when executed by the control node 200 causes the processing circuitry 210, possibly in conjunction with the communications interface 220 and the storage medium 230, to transmit the paging message 1120 in order for the control node 200 to perform step S106.

Embodiments relating to further details of paging the at least one client node 300a, 300b, 300c, 300d, 300e in the group communications system 100, 1100a, 1100b, 1100c will now be disclosed.

The at least one client node 300a, 300b, 300c, 300d, 300e can be in idle mode when the paging message 1120 is broadcasted. Hence, according to an embodiment the paging message 1120 is intended to be received by client node 300a, 300b, 300c, 300d, 300e in idle mode.

There may be different kinds of paging messages 1120 that can be transmitted in step S106. Different embodiments relating thereto will now be disclosed in turn.

According to a first embodiment the paging message 1120 is an individual paging message 1120. Thus, the paging message 1120 can represent an individual paging message 1120. This individual paging message 1120 is transmitted to at least one client node 300*a*, 300*b*, 300*c*, 300*d*, 300*e*. The individual paging message, according to some aspects, therefore comprises an identifier of this one of the at least one client node 300*a*, 300*b*, 300*c*, 300*d*, 300*e*.

According to a second embodiment the paging message 1120 is a group paging message 1120. Thus, the paging message 1120 can represent one common group paging message 1120. This common group paging message 1120 is transmitted to a group 1110*a*, 1110*b* of client nodes 300*a*, 300*b*, 300*c*, 300*d*, 300*e*. The group paging message 1120, according to some aspects, therefore comprises an identifier of the group 1110*a*, 1110*b* of the at least one client node 300*a*, 300*b*, 300*c*, 300*d*, 300*e*.

There may be different kinds of MBMS bearers on which the paging message 1120 can be transmitted, as in step S106. Different embodiments relating thereto will now be disclosed in turn.

According to a first embodiment the MBMS bearer is a Service Announcement MBMS bearer. Hence, the MBMS bearer on which the paging message 1120 can be transmitted can be used for Service Announcement in the group communications system 100, 1100*a*, 1100*b*, 1100*c*.

According to a second embodiment the MBMS bearer is a for Floor Control MBMS bearer. Hence, the MBMS bearer on which the paging message 1120 can be transmitted can be used for Floor Control in the group communications system 100, 1100*a*, 1100*b*, 1100*c*.

According to a third embodiment the MBMS bearer is a Group communication control message MBMS bearer. Hence, the MBMS bearer on which the paging message 1120 can be transmitted can be used for Control messages in the group communications system 100, 1100*a*, 1100*b*, 1100*c*.

According to a fourth embodiment the MBMS bearer is a general Group communication MBMS bearer, for example an MBMS bearer used for media transmission, in the group communications system 100, 1100*a*, 1100*b*, 1100*c*.

Reference is now made to FIG. 6 illustrating methods for paging at least one client node 300*a*, 300*b*, 300*c*, 300*d*, 300*e* in a group communications system 100, 1100*a*, 1100*b*, 1100*c* as performed by the control node 200 according to further embodiments. Steps S102 and S106 are performed as disclosed above.

There may be different ways for the control node 200 to obtain the need for paging. Different embodiments relating thereto will now be described in turn.

According to a first embodiment the control node 200 is configured to obtain the need as a result of a packet being destined for the at least one client node 300*a*, 300*b*, 300*c*, 300*d*, 300*e*, as in step S102*a*:

S102*a*: The control node 200 obtains an indication that at least one packet is destined for the at least one client node 300*a*, 300*b*, 300*c*, 300*d*, 300*e*. Step S102*a* may be performed in conjunction with, or as part of, step S102. This indication can be obtained from the node (such as another client node 300*a*, 300*b*, 300*c*, 300*d*, 300*e*) or device from which the at least one packet is originating. Alternatively the indication can be obtained from another control node or from a management node. In this respect the second obtain module 210C comprises instructions that when executed by the control node 200 causes the processing circuitry 210, possibly in conjunction with the communications interface 220 and the storage medium 230, to obtain the indication in order for the control node 200 to perform step S102*a*.

Further, according to the first embodiment the paging message 1120 can indicate that the at least one packet is to be transmitted to the at least one client node 300*a*, 300*b*, 300*c*, 300*d*, 300*e* over a unicast bearer.

According to a second embodiment the at least one client node 300*a*, 300*b*, 300*c*, 300*d*, 300*e* participates in a group call on an MBMS bearer in the group communications system 100, 1100*a*, 1100*b*, 1100*c*. According to the second embodiment the control node 200 is configured to obtain the need as a result of the at least one client node 300*a*, 300*b*, 300*c*, 300*d*, 300*e* being moved to a unicast bearer as in step S102*b*:

S102*b*: The control node 200 obtains an indication that the group call is to be moved to a unicast bearer. Step S102*b* may be performed in conjunction with, or as part of, step S102. In this respect the third obtain module 210*d* comprises instructions that when executed by the control node 200 causes the processing circuitry 210, possibly in conjunction with the communications interface 220 and the storage medium 230, to obtains the indication in order for the control node 200 to perform step S102*b*.

In general terms, each client node 300*a*, 300*b*, 300*c*, 300*d*, 300*e*, according to some aspects, reports its location whilst physically being moved in the group communications system 100, 1100*a*, 1100*b*, 1100*c*. This reporting can be performed as specified according to document 3GPP TS 23.179 V1.2.0. This location information is, according to some aspects, used when the at least one client node 300*a*, 300*b*, 300*c*, 300*d*, 300*e* is to be paged. For example, the at least one client node 300*a*, 300*b*, 300*c*, 300*d*, 300*e* can then be paged over a bearer active in the current service area identifier (SAI) area and optionally also over a bearer active in at least one neighbor SAI. Hence, the MBMS bearer used for transmitting the paging message 1120 can be active in a first area defined by a current SAI of the at least one client node 300*a*, 300*b*, 300*c*, 300*d*, 300*e* or in at least one second area defined by a SM neighbouring the current SAI. Therefore, according to an embodiment the control node 200 is configured to perform step S104:

S104: The control node 200 obtains a current location of the at least one client node 300*a*, 300*b*, 300*c*, 300*d*, 300*e*. The current location can then define the current SAI. By means of the location information the at least one client node 300*a*, 300*b*, 300*c*, 300*d*, 300*e* does not need to be paged over a large area. Step S104 may be performed after step S102 but before step S106. In this respect the fourth obtain module 210*e* comprises instructions that when executed by the control node 200 causes the processing circuitry 210, possibly in conjunction with the communications interface 220 and the storage medium 230, to obtains the current location in order for the control node 200 to perform step S104.

Reference is now made to FIG. 7 illustrating a method for receiving paging in a group communications system 100, 1100*a*, 1100*b*, 1100*c* as performed by the client node 300*a* according to an embodiment.

S204: The client node 300*a* receives a paging message 1120 for the client node 300*a* on an MBMS bearer. The paging message 1120 is received from a control node 200 of the group communications system 100, 1100*a*, 1100*b*, 1100*c*. In this respect the receive module 310*a* comprises instructions that when executed by the client node 300*a* causes the processing circuitry 310, possibly in conjunction with the communications interface 320 and the storage medium 330, to receive the paging message 1120 in order for the client node 300a to perform step S204.

Embodiments relating to further details of receiving paging in a group communications system 100, 1100a, 1100b, 1100c as performed by the client node 300a will now be disclosed.

As disclosed above, the client node 300a can be in idle mode when the paging message 1120 is broadcasted, and thus received by the client node 300a in step S204. Hence, according to an embodiment the client node 300a is in idle mode when receiving the paging message 1120 in step S204.

As further disclosed above, there may be different kinds of paging messages 1120 that can be transmitted in step S106, and thus received by the client node 300a in step S204. These embodiments thus apply also to the client node 300a.

According to a first embodiment the paging message 1120 is an individual paging message 1120. Thus, the paging message 1120 can represent an individual paging message 1120 and comprise an individual identifier of the client node 300a.

According to a second embodiment the paging message 1120 is a group paging message 1120. Thus, the paging message 1120 can represent one common group paging message 1120 and comprise a group identifier of a group 1110a, 1110b of client nodes 300a, 300b, 300c, 300d, 300e, and wherein the client node 300a is a member of the group 1110a, 1110b.

There may be different kinds of information comprised in the paging messages 1120. For example, the paging message 1120 can indicate that at least one packet destined for the client node 300a is to be transmitted to the client node 300a over a unicast bearer. Additionally or alternatively, the paging message 1120 can indicates that the client node 300a shall acquire a unicast radio bearer. The paging message 1120, according to some aspects, thus serves as to wake up the client node 300a for packets that will be transmitted on unicast. The MBMS bearer might still be monitored by the client node 300a.

As further disclosed above, there may be different kinds of MBMS bearers on which the paging message 1120 can be transmitted in step S106, and thus received by the client node 300a in step S204. These embodiments thus apply also to the client node 300a. According to a first embodiment the MBMS bearer is used for Service Announcement in the group communications system 100, 1100a, 1100b, 1100c. According to a second embodiment the MBMS bearer is used for Floor Control in the group communications system 100, 1100a, 1100b, 1100c. According to a third embodiment the MBMS bearer is used for Control messages in the group communications system 100, 1100a, 1100b, 1100c. According to a fourth embodiment the MBMS bearer is a general Group communication MBMS bearer, for example an MBMS bearer used for media transmission, in the group communications system 100, 1100a, 1100b, 1100c.

Reference is now made to FIG. 8 illustrating methods for receiving paging in a group communications system 100, 1100a, 1100b, 1100c as performed by the client node 300a according to further embodiments. Step S204 is performed as disclosed above.

The paging message 1120 could be sent over a bearer that the client node 300a is monitoring. The client node 300a can thus already be monitoring the the MBMS bearer when receiving the paging message 1120. Hence, the client node 300a can be configured to perform step S202:

S202: The client node 300a monitors the MBMS bearer prior to receiving the paging message 1120. In this respect the monitor module 310b comprises instructions that when executed by the client node 300a causes the processing circuitry 310, possibly in conjunction with the communications interface 320 and the storage medium 330, to monitor the MBMS bearer in order for the client node 300a to perform step S202.

There may be different actions taken by the client node 300a upon having received the paging message 1120. Particularly, the client node 300a can be configured to perform steps S206 and S208:

S206: The client node 300a initiates a service request with a core network node. The service request is initiated in order for the client node 300a to enter connected mode. In this respect the initiate module 310c comprises instructions that when executed by the client node 300a causes the processing circuitry 310, possibly in conjunction with the communications interface 320 and the storage medium 330, to initiate the service request in order for the client node 300a to perform step S206.

S208: The client node 300a enters connected mode by re-establishing a radio access bearer (RAB). In this respect the enter module 310d comprises instructions that when executed by the client node 300a causes the processing circuitry 310, possibly in conjunction with the communications interface 320 and the storage medium 330, to enter connected mode in order for the client node 300a to perform step S208.

An MBMS bearer may thereby be used to speed up the notification to the client node 300a that there is incoming packets over unicast and that the client node 300a therefore should initiate a service request, enter connected mode and re-establish a RAB. This is particularly applicable to client nodes 300a that are in idle mode and that are monitoring an MBMS bearer.

The multicast channel (MCH) Scheduling Period (MSP) can thereby be configured down to 40 ms intervals. This will allow the client node 300a to initiate a state transfer to connected mode before the state of the art MME initiated paging will reach the client node 300a. The latency to set up a radio bearer to enable downlink delivery of packets (e.g. media) to the client node 300a will thus be reduced. The saving for the paging part could be in the region from 320/2=160 ms in average (or even more since a network operator may tune this parameter to e.g. 640 ms or 1280 ms) to as low as 40/2=20 ms in average. That is, with reference to FIG. 1, the signalling flow of the herein disclosed embodiments as defined by arrow 170 will reach the client node 300a before the signalling flow of state of the art as defined by arrow 160.

Figure 10:
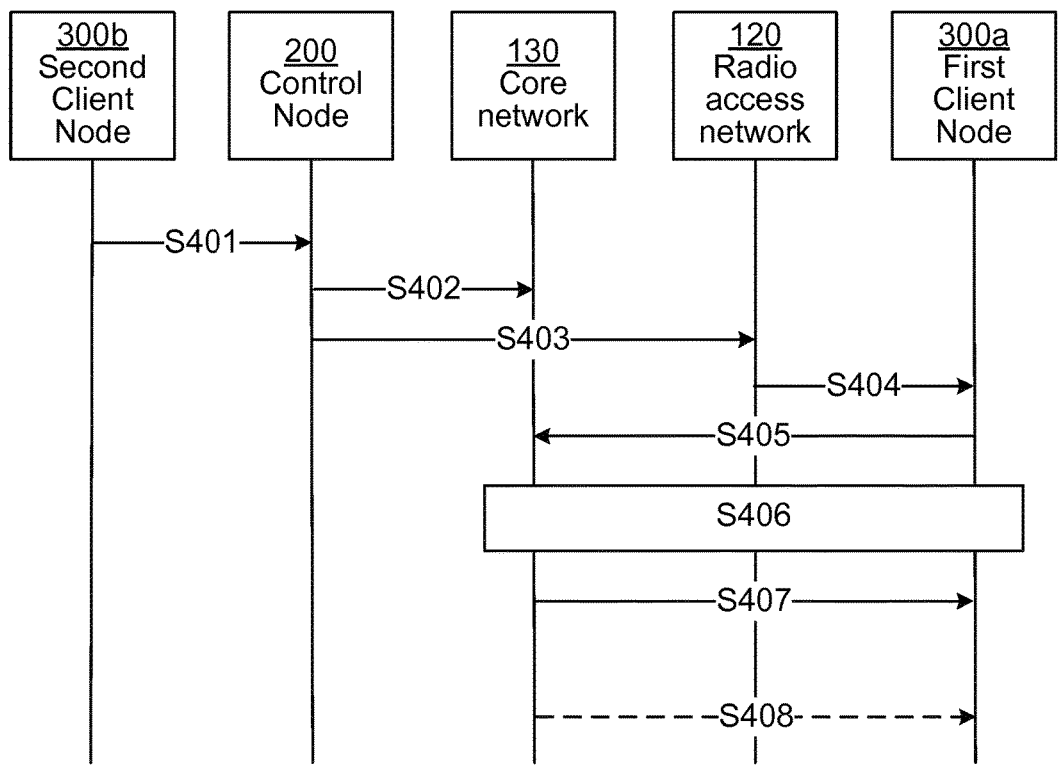
FIG. 10 is a signalling diagram according to embodiments.

One particular embodiment for paging at least one client node 300a, 300b, 300c, 300d, 300e in a group communications system 100, 1100a, 1100b, 1100c based on at least some of the above disclosed embodiments will now be disclosed in detail with reference to the signalling diagram of FIG. 10.

S401: A client node 300b, denoted a second client node, transmits data intended to be received by the first client node 300a.

S402: The control node 200 obtains an indication that the second client node 300b transmits data intended to be received by the first client node 300a. In response thereto the control node 200 transmits the data to the core network 130. One way to implement step S402 is to perform any of step S102 and step S102a.

S403: The indication that the second client node 300b transmits data intended to be received by the first client node 300a is by the control node 200 interpreted as a need for paging the first client node 300a in the group communications system. The control node 200 therefore, also in response to having obtained the indication, transmits a paging message 1120 for the first client node 300a on an MBMS bearer. One way to implement step S403 is to perform step S106.

S404: The paging message 1120 is received, and forwarded by, the radio access network 120. The radio access network 140 then delivers the paging message 1120 to the first client node 300a. Hence, the first client node 300a receives the paging message 1120 on the MBMS bearer. One way to implement step S404 is to perform step S204.

S405: The first client node 300a, in response to having received the paging, makes a service request to the core network 130 over the radio access network 120. One way to implement step S405 is to perform step S206.

S406: A unicast radio access bearer is established for the first client node 300a in response to the service request. This causes the first client node 300a to enter connected mode. One way to implement step S406 is to perform step S208.

S407: The core network 130 delivers the data to the first client node 300a using unicast transmission over the established radio access bearer.

S408: The core network 130, optionally, pages the first client node 300a at a later point in time. This paging is performed according to state of the art paging mechanisms for paging the client node 300a from the core network 130.

Figure 11:
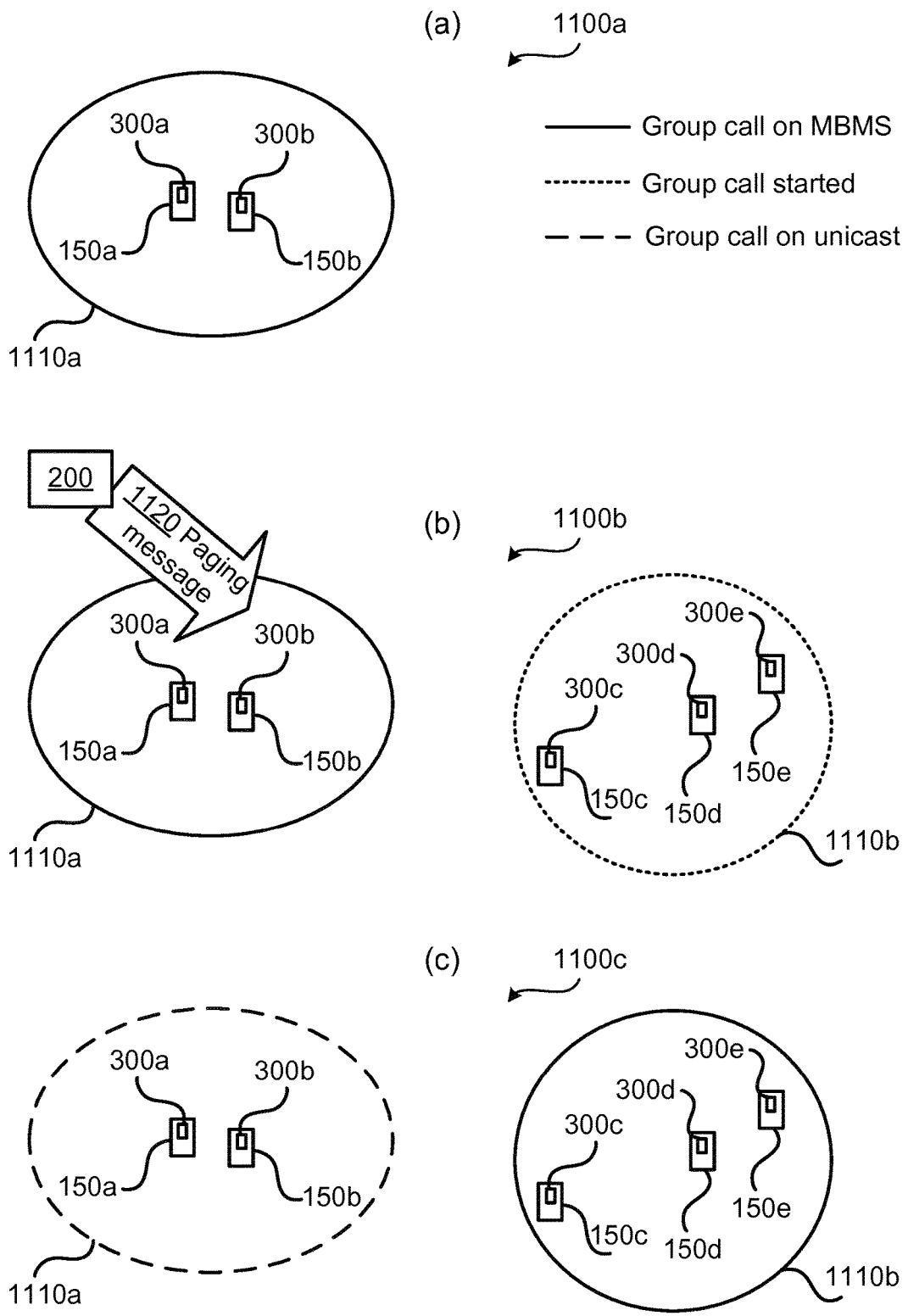

Assume a group communications system 1100a as schematically illustrated in FIG. 11(*a*). The group communications system 1100a comprises a first group 1110a of client nodes 300a, 300b, where the first group 1110a of client nodes 300a, 300b are engaged in a group call on an MBMS bearer.

When MBMS is used for group communication, the control node 200 might in near real time determine that another group of client nodes shall use the MBMS resource. Consider therefore the situation of the group communications system 1100b of FIG. 11(*b*). In relation to the group communications system 1100a of FIG. 11(*a*) the group communications system 1100b of FIG. 11(*b*) further comprises a second group 1110b of client nodes 300c, 300d, 300e, where a group call is started for the second group mob of client nodes 300c, 300d, 300e. If there are not sufficient MBMS resources to serve both groups over MBMS, one of the groups must be moved to unicast transmission. Assume that there is a higher number of client nodes 300c, 300d, 300e in the second group 1110b than client nodes 300a, 300b in the first group 1110a. The control node 200 therefore determines the first group 1110a of client nodes 300a, 300b to be moved to unicast and therefore transmits a paging message 1120 to the first group 1110a of client nodes 300a, 300b, as in step S106. It is assumed that this paging message is received by the first group 1110a of client nodes 300a, 300b, as in step S204. The control node 200 can thus page the the first group 1110a of client nodes 300a, 300b and then (much faster than state of the prior art) move the group call to unicast transmission to let the second group 1110b of client nodes 300c, 300d, 300e use the MBMS bearer for the new group call.

As a result thereof, the first group 1110a of client nodes 300a, 300b are moved to unicast and hence the group call previously conducted on the MBMS bearer is now conducted on unicast. The group call for the second group 1110b of client nodes 300c, 300d, 300e can then be started on the MBMS bearer. This situation is illustrated in the group communications system 1100c of FIG. 11(*c*). This improves the resource efficiency compared to if the group call of the second group 1110b of client nodes 300c, 300d, 300e would have been be started on unicast. Using currently existing paging procedure will result in delay and possibly packet loss.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method in a group communications system, the method being performed by a control node of the group communications system, the method comprising:
   deciding to initiate a media transmission for a group call over a unicast bearer; and
   as a result of deciding to initiate the media transmission for the group call over a unicast bearer, transmitting a group paging message on an MBMS bearer, wherein
   the group paging message comprises an identifier that identifies a client group;
   the group paging message informs the client nodes in the client group that the control node will initiate media transmission for the group call over a unicast bearer, and
   the group paging message will cause a client node in the client group that is in an idle mode to initiate a service request to transfer the client node to a connected mode.

2. The method of claim 1, further comprising, prior to deciding to initiate a media transmission for a group call over a unicast bearer, obtaining an indication that the group call is to be moved to a unicast bearer.

3. The method of claim 1, wherein the deciding to initiate the media transmission is performed as a result of obtaining the indication that the group call is to be moved to a unicast bearer.

4. The method of claim 1, wherein the MBMS bearer is used for at least one of:
   Service Announcement in the group communications system,
   Floor Control in the group communications system, and
   Control messages in the group communications system.

5. The method of claim 1, wherein the MBMS bearer is a general Group communication MBMS bearer in the group communications system.

6. The method of claim 1, wherein the MBMS bearer used for transmitting the paging message is active in a first area defined by a current service area identifier, SAT, of the at least one client node or in at least one second area defined by a SAI neighbouring the current SAT.

7. The method of claim 6, further comprising:
   obtaining a current location of the at least one client node, wherein the current location defines the current SAT.

8. The method of claim 1, further comprising, prior to deciding to initiate the media transmission for the group call over a unicast bearer:
   deciding to us an MBMS bearer for the group call; and
   using the MBMS bearer for the group call.

9. The method of claim 8, wherein deciding to initiate the media transmission for the group call over a unicast bearer comprises deciding to transfer the group call to unicast delivery.

10. A method performed by a client node, the method comprising:
    receiving a group paging message that was transmitted on an MBMS bearer by a control node of a group communications system as a result of the control node deciding to initiate a media transmission for a group call over a unicast bearer, wherein the client node is in idle mode when receiving the paging message; and in response to receiving the paging message, initiating a transition from an idle mode to a connected mode, wherein the group paging message comprises an identifier that identifies a client group of which the client node is a member, and the group paging message informs the client nodes in the client group that the control node will initiate media transmission for the group call over the unicast bearer.

11. The method of claim 10, wherein the group call was ongoing prior to the client node receiving the group paging message.

12. The method of claim 10, further comprising, upon having received the paging message:

initiating a service request with a core network node;
entering connected mode by re-establishing a radio access bearer, RAB.

13. The method of claim 10, wherein the MBMS bearer is used for at least one of:

Service Announcement in the group communications system,

Floor Control in the group communications system, and

Control messages in the group communications system.

14. The method of claim 10, wherein the MBMS bearer is a general Group communication MBMS bearer in the group communications system.

15. A control node for paging at least one client node in a group communications system, the control node comprising processing circuitry, the processing circuitry being configured to cause the control node to:

decide to initiate a media transmission for a group call over a unicast bearer; and as a result of deciding to initiate the media transmission for the group call over a unicast bearer, transmit a group paging message on an MBMS bearer, wherein the group paging message comprises an identifier that identifies a client group;

the group paging message informs the client nodes in the client group that the control node will initiate media transmission for the group call over a unicast bearer, and the group paging message will cause a client node in the client group that is in an idle mode to initiate a service request to transfer the client node to a connected mode.

16. A client node, the client node comprising:

a receiver for receiving a group paging message that was transmitted on an MBMS bearer by a control node of a group communications system as a result of the control node deciding to initiate a media transmission for a group call over a unicast bearer, wherein the client node is in idle mode when receiving the paging message, wherein the group paging message comprises an identifier that identifies a client group of which the client node is a member, and wherein the group paging message informs the client nodes in the client group that the control node will initiate media transmission for the group call over the unicast bearer; and processing circuitry, the processing circuitry being configured to cause the client node to initiate a transition from an idle mode to a connected mode in response to receiving the paging message.

* * * * *

UNITED STATES PATENT AND TRADEMARK OFFICE
CERTIFICATE OF CORRECTION

PATENT NO. : 10,506,551 B2
APPLICATION NO. : 16/061147
DATED : December 10, 2019
INVENTOR(S) : Åkesson et al.

Page 1 of 1

It is certified that error appears in the above-identified patent and that said Letters Patent is hereby corrected as shown below:

In the Specification

In Column 4, Line 26, delete "sixth seventh, eight," and insert -- sixth, seventh, eighth, --, therefor.

In Column 4, Line 30, delete "eight," and insert -- eighth, --, therefor.

In Column 13, Line 63, delete "the the MBMS" and insert -- the MBMS --, therefor.

In Column 15, Line 42, delete "group mob" and insert -- group 1110b --, therefor.

In Column 15, Line 55, delete "the the first" and insert -- the first --, therefor.

In the Claims

In Column 16, Line 48, in Claim 6, delete "SAT," and insert -- SAI, --, therefor.

In Column 16, Line 50, in Claim 6, delete "SAT." and insert -- SAI. --, therefor.

In Column 16, Line 53, in Claim 7, delete "SAT." and insert -- SAI. --, therefor.

Signed and Sealed this
Nineteenth Day of May, 2020

Andrei Iancu
*Director of the United States Patent and Trademark Office*